Figure 1:
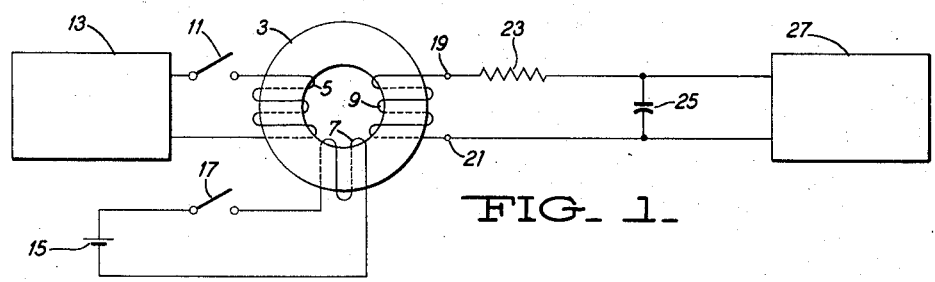

Aug. 4, 1959

M. J. KELLY 2,898,580

IMPROVED READOUT CIRCUIT FOR MULTISTABLE MAGNETIC CORES

Filed Oct. 23, 1956

INVENTOR.
MARTIN J. KELLY

BY *Paul M. Banner*

AGENT.

United States Patent Office 2,898,580
Patented Aug. 4, 1959

2,898,580

IMPROVED READOUT CIRCUIT FOR MULTI-STABLE MAGNETIC CORES

Martin J. Kelly, Endwell, N.Y., assignor to International Business Machines Corporation, New York, N.Y., a corporation of New York Application October 23, 1956, Serial No. 617,754

10 Claims. (Cl. 340—174)

This invention relates to multistable magnetic core storage apparatus, and particularly to an improved arrangement for uniquely determining the saturation of a multistable core.

It is known that a core of suitable magnetic material may be made to traverse its hysteresis loop in a series of discrete and substantially equal steps, in accordance with the supply of discrete pulses of input energy to the core. Such multistable cores have been proposed in which a core is driven from a selected one of its two remanent flux states to the other of its two remanent flux states in a predetermined number of steps, so that the core may be employed as a counting device.

In such previous devices, it is proposed to detect the arrival of the core at its "full" condition, i.e., saturated in a selected direction, by the reduction in amplitude of output voltage pulses induced in an output winding inductively coupled to the core. Since each of the increments of flux along the hysteresis loop are substantially equal, equal output voltage pulses are induced for each step as a result of each input pulse, save the last. Upon the reception of the last input pulse, the core is driven to its dynamic saturation value, and then relaxes to its remanent flux state. This change of flux is somewhat smaller than the previous flux changes, and accordingly, the magnitude of the output voltage pulse is diminished. This change in magnitude can be detected by amplitude detection circuits to provide an indication of the $n$th pulse from a core having $n$ stable states.

However, it is relatively difficult to provide suitable amplitude detection circuits which will, under all conditions, distinguish between the $n$th output pulse and those preceding. The output pulses from one core, prior to the $n$th pulse, may be of the same magnitude as those provided by another core for the $n$th pulse. Variations in temperature, circuit parameters, and power supply variations may adversely affect the operation of such devices.

It is accordingly an object of this invention to provide an improved output circuit for an $n$ state multistable magnetic core, which provides an output pulse for the $n$th state of the core which is easily distinguished from the previous pulses.

Another object of the invention is to provide an improved output circuit for an $n$ state multistable magnetic core which provides an output pulse for the $n$th state of the core which is substantially greater in magnitude than any pulses of like polarity preceding the $n$th output pulse.

A further object of this invention is to provide an improved output circuit for an $n$ state multistable magnetic core which comprises circuit components associated with an output winding of the core to form a circuit which is critically damped only for the values of inductance of the winding existing when the core is not saturated, so that the circuit tends to an oscillatory state when the core reaches its $n$th or saturated state.

Still another object of the invention is to provide an improved output circuit for an $n$ state multistable core in which suitable values of resistance and capacitance are included in the output circuit to render the circuit oscillatory for the $n$th state of the core.

A principal object of the invention is to provide an improved output circuit for a multistage magnetic core.

Briefly described, an output circuit in accordance with a preferred embodiment of the invention comprises a resistor and a capacitor connected in series across the output winding of an $n$ state multistable core, and having output terminals connected across at least one of the circuit elements, such as the capacitor. The circuit parameters are selected, as by choosing suitable values of resistance and capacity, so that the circuit, including the output winding, comprises a critically damped circuit, for the value of inductance of the output winding when the core is not saturated. Accordingly, each input pulse preceding the $n$th pulse will induce an output pulse in the output winding, these pulses being substantially unidirectional and non-oscillatory.

On the $n$th input pulse, the core will be saturated and the value of the inductance of the output winding will change, so that the critically damped condition no longer exists, and an oscillatory condition is provided. The energy induced in the winding will therefore attempt to set up oscillations and at least a portion thereof will be represented by a relatively high amplitude pulse of a polarity opposite to that of the higher amplitude portions of the preceding pulses. Such a pulse is readily distinguished from the preceding pulses, as compared to the usual low-amplitude pulse heretofore characteristic of the saturation of multistable cores.

Other objects of the invention will be pointed out in the following description and claims and illustrated in the accompanying drawings, which disclose, by way of examples, the principle of the invention and the best mode, which has been contemplated, of applying that principle.

Figure 2:
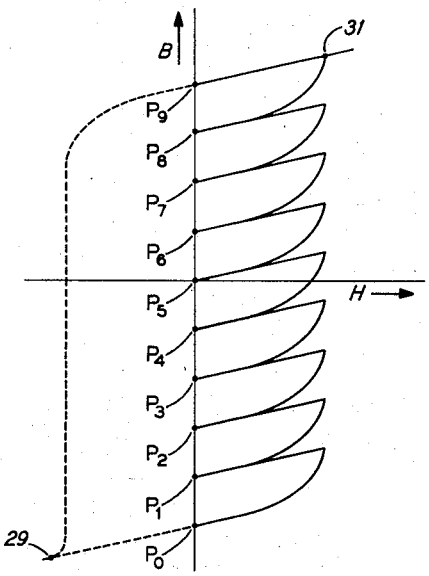
Figure 3:
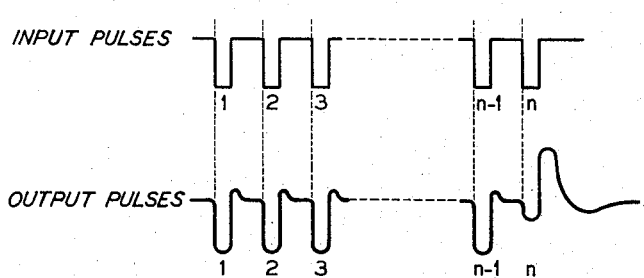

In the drawings:

Fig. 1 is a diagrammatic view of a multistable core and associated input and output circuits, illustrating a preferred embodiment of the invention, Fig. 2 is an illustration of a hysteresis curve or loop for a core as illustrated in Fig. 1, and Fig. 3 is an illustration of typical input and output waveforms for an arrangement as shown in Fig. 1.

Referring now to Fig. 1, the reference character 3 designates a core of magnetic material having an input winding 5, a reset winding 7, and an output winding 9 mounted thereon in an inductive relation. Input winding 5 is connected at times by closure of a switch 11 to a pulse source 13, which may take any one of a number of forms known in the art, and is hence indicated schematically. The pulses supplied from the pulse source 13 must be accurately quantized, that is, the product of the pulse amplitude and the duration of the pulse must be constant to a relatively high degree, for reasons to be subsequently explained. A suitable source of resetting energy, here indicated as a battery 15, is connected at times to winding 7 by closure of a switch 17. The parts are connected and arranged so that the polarity of the flux set up in core 3 by energization of winding 7 is opposite to the polarity of flux set up in core 3 by energization of winding 5.

Output winding 9 is provided with terminals 19 and 21, across which a resistor 23 and a capacitor 25 are connected in series. A suitable pulse detecting device 27 such as, for example, an oscilloscope, is shown connected across the capacitor 25, to provide an indication of the magnitude and polarity of the voltage existing across the capacitor.

In operation, the core 3 is initially set to one of its two saturated remanent flux states by closing switch 17 for at least sufficient time to permit the core to assume the desired state. For the sake of illustration, it will be assumed that the desired initial flux state is that designated by the reference character $P_0$ on the hysteresis loop of Fig. 2. Energization of the reset winding 7 will cause the core material to traverse the hysteresis loop from any other point to the point designated by reference character 29, which may be said to be the negative dynamic saturation point. When winding 7 is deenergized, the core relaxes, so that the negative remanent flux state is attained, designated by $P_0$.

Following the resetting of core 3, the switch 11 may be closed, whereupon a series of input pulses, such as diagrammatically indicated in Fig. 3, are supplied to the input winding 5 of the core. The connections are arranged, as previously pointed out, so that the flux created in core 3 by the input pulses is opposite in polarity to the remanent flux state of the core when reset.

The input pulses are controlled so that the duration and amplitude are such that each pulse is capable of contributing a predetermined amount of magnetization to the core. Thus the first input pulse will cause the magnetization of the core to proceed along the first minor hysteresis loop, at the bottom of the hysteresis loop shown in Fig. 2, starting at point $P_0$ and terminating at point $P_1$, so that, at the end of the first pulse, the magnetization state of the core is that represented by point $P_1$. Subsequent pulses continue the magnetization process in corresponding and equal steps, as indicated by the successive minor loops terminating at points $P_2$, $P_3$, etc., to and including $P_9$. In other words, assuming that core 3 is arranged to count on a decimal basis, the first nine pulses will cause the magnetization of the core to proceed in nine equal steps from the initial or reset value of remanent flux to the opposite or final state of remanent flux.

The tenth pulse, and any following pulses, when supplied to the core, will cause the core to be driven from point $P_9$ to point 31, and then to relax to point $P_9$ again. Since the core is saturated for these pulses, the change in flux occurring in the core is relatively small compared to the changes which occur for each of the pulses preceding the $n$th pulse, in the present case, the first nine pulses.

From the foregoing it is seen that with an arrangement as shown in Fig. 1 and described heretofore, the magnetization of the core proceeds in equal steps for each of the input pulses preceding the $n$th pulse for an $n$ state core. The change in magnetization occurring during the $n$th input pulse is considerably smaller than the previous changes.

Advantage is taken of this difference in change of magnetization in the present invention to obtain an $n$th output pulse which is easily distinguishable from the preceding output pulses, as will now be explained in detail.

Any changes of flux in core 3 will induce output voltages in the output winding 9, in accordance with usual transformer action. Moreover, since the changes in flux in the core prior to the $n$th input pulse are equal, the inductance of the output winding 9 will remain substantially constant. The resistor 23 and the capacitor 25 are selected so that, with the value of inductance of the output winding preceding the $n$th input pulse, a critically damped circuit is provided. The output voltage pulses for the input pulses preceding the $n$th pulse are critically damped and are hence substantially unipolar, the polarity being determined in the usual manner with respect to the input pulses. The relation between the input pulses and the corresponding output pulses for the first, second, third, ... $n-1$ input pulses is diagrammatically illustrated in Fig. 3.

For the $n$th input pulse, the inductance of winding 9 will appreciably change, in view of the decreased amount of change of magnetization, and accordingly, the output circuit will no longer be critically damped, but instead will approach or attain the oscillatory state. One or more cycles of oscillation will therefore occur, and as illustrated in Fig. 3 for the $n$th output pulse there will exist at least one-half cycle having a relatively large amplitude and opposite polarity with respect to the significant portion of the preceding output pulses. Obviously, this pulse is readily distinguishable from the preceding pulses, either by polarity, magnitude, or a combination of these two characteristics. For example, the pulse detection device 27 may be arranged to discriminate between the polarities of relatively large amplitude pulses, so that only the upwardly directed portion of the $n$th pulse will be recognized by the pulse detector.

The core may now be reset by opening switch 11 and closing switch 17, so that another group of input pulses may thereafter be counted.

Other variations of the basic arrangement shown in Fig. 1 will suggest themselves to those skilled in the art. For example, the functions of the various windings may be combined, in different combinations, with appropriate switching circuits, e.g., a single winding may be employed for both input and reset, or for output and reset. Additionally, the critically damped output circuit may include other circuit components, or the components may be rearranged in various serial, parallel or serial parallel configurations. The pulse detector 27 may be connected across any one or any series pair of the circuit components or it may be connected in series with the critically damped circuit to detect the damped or oscillatory outputs.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a multistable magnetic core storage device including a magnetizable element capable of assuming a plurality of intermediate remanent flux states between two limiting remanent flux states, means for initially magnetizing said element to one of said two limiting states, means for magnetizing said element in a plurality of equal and discrete steps from said one limiting state to the other of said two limiting states, the combination comprising output winding means inductively associated with said magnetizable element, and electrical damping means coupled to said output winding means having parameters selected to critically damp output voltage pulses induced in the output winding by each of said equal and discrete steps of magnetization.

2. In a multistable magnetic core storage device including a magnetizable element capable of assuming a plurality of intermediate remanent flux states between two limiting remanent flux states, means for initially magnetizing said element to one of said two limiting states, means for magnetizing said element in a plurality of equal and discrete steps from said one limiting state to the other of said two limiting states, the combination comprising an output winding inductively associated with said magnetizable element, and circuit means including a capacitor coupled to said output winding, said capacitor having a value selected to critically damp output voltage pulses induced in the output winding by each of said equal and discrete steps of magnetization.

3. In a multistable magnetic core storage device including a magnetizable element capable of assuming a plurality of intermediate remanent flux states between two limiting remanent flux states, means for initially magnetizing said element to one of said two limiting states, means for magnetizing said element in a plurality of equal and discrete steps from said one limiting state to the other of said two limiting states, the combination comprising an output winding inductively associated with said magnetizable element, and circuit means including a capacitor and a resistor coupled to said output winding and selected to critically damp output voltage pulses induced in said output winding by each of said equal and discrete steps of magnetization.

4. In a multistable magnetic core storage device including a magnetizable element capable of assuming a plurality of intermediate remanent flux states between two limiting remanent flux states, means for initially magnetizing said element to one of said two limiting states, means for magnetizing said element in a plurality of equal and discrete steps from said one limiting state to the other of said two limiting states, the combination comprising an output winding inductively associated with said magnetizable element, and circuit means including a resistor and a capacitor connected in series across said output winding and selected to critically damp output voltage pulses induced in said output winding by each of said equal and discrete steps of magnetization.

5. In a multistable magnetic core storage device, in combination, a core of magnetizable material which is capable of assuming two stable limiting states of remanent flux of relatively opposite polarity, and capable of assuming a plurality of intermediate remanent flux states between said two limiting states, first winding means inductively associated with said core for magnetizing said core to a selected one of said limiting states and for thereafter magnetizing said core in a plurality of equal and discrete steps from said selected limiting state to the other of said limiting states, second winding means inductively associated with said core and having a relatively constant value of inductance during plurality of magnetizing steps, said value of inductance being substantially reduced when said core is magnetized to said other of said limiting states, and electrical damping means coupled to said second winding means and uniquely responsive to said reduction of inductance of said second winding means.

6. In a multistable magnetic core storage device, in combination, a core of magnetizable material which is capable of assuming two stable limiting states of remanent flux of relatively opposite polarity, and capable of assuming a plurality of intermediate remanent flux states between said two limiting states, first winding means inductively associated with said core for magnetizing said core to a selected one of said limiting states and for thereafter magnetizing said core in a plurality of equal and discrete steps from said selected limiting state to the other of said limiting states, second winding means inductively associated with said core and having a relatively constant value of inductance during said plurality of magnetizing steps, said value of inductance being substantially reduced when said core is magnetized to said other of said limiting states, and electrical damping means coupled to said second winding means and effective to critical damp output voltage pulses only for said constant values of inductance of said second winding means and ineffective to damp output pulses when said value of inductance is reduced.

7. In a mutlistable magnetic core storage device, in combination, a core of magnetizable material which is capable of assuming two stable limiting states of remanent flux of relatively opposite polarity, and capable of assuming a plurality of intermediate remanent flux states between said two limiting states, first winding means inductively associated with said core for magnetizing said core to a selected one of said limiting states and for thereafter magnetizing said core in a plurality of equal and discrete steps from said selected limiting state to the other of said limiting states, second winding means inductively associated with said core and having a relatively constant value of inductance during said plurality of magnetizing steps, said value of inductance being substantially reduced when said core is magnetized to said other of said limiting states, and electrical damping means coupled to said second winding means and uniquely responsive to said reduction of inductance of said winding means, comprising circuit means coupled to said second winding means including at least one capacitive element selected to provide critical damping for output voltage pulses only for said constant value of inductance of said second winding means.

8. In a multistable magnetic core storage device, in combination, a core of magnetizable material which is capable of assuming two stable limiting states of remanent flux of relatively opposite polarity, and capable of assuming a plurality of intermediate remanent flux states between said two limiting states, first winding means inductively associated with said core for magnetizing said core to a selected one of said limiting states and for thereafter magnetizing said core in a plurality of equal and discrete steps from said selected limiting state to the other of said limiting states, second winding means inductively associated with said core and having a relatively constant value of inductance during said plurality of magnetizing steps, said value of inductance being substantially reduced when said core is magnetized to said other of said limiting states, and electrical damping means coupled to said second winding means and uniquely responsive to said reduction of inductance of said second winding means, comprising a resistor and a capacitor coupled to said second winding means and selected to provide critical damping for output voltage pulses only for said constant value of inductance of said second winding means.

9. In a multistable magnetic core storage device, in combination, a core of magnetizable material which is capable of assuming two stable limiting states of remanent flux of relatively opposite polarity, and capable of assuming a plurality of intermediate remanent flux states between said two limiting states, first winding means inductively associated with said core for magnetizing said core to a selected one of said limiting states and for thereafter magnetizing said core in a plurality of equal and discrete steps from said selected limiting state to the other of said limiting states, second winding means inductively associated with said core and having a relatively constant value of inductance during said plurality of magnetizing steps, said value of inductance being substantially reduced when said core is magnetized to said other of said limiting states, and electrical damping means coupled to said second winding means and uniquely responsive to said reduction of inductance of said second winding means, comprising a resistor and a capacitor connected in series across said second winding means and selected to provide critical damping for output voltage pulses only for said constant value of inductance of said second winding means.

10. In a multistable magnetic core storage device, in combination, a core of magnetizable material which is capable of assuming two stable limiting states of remanent flux of relatively opposite polarity, and capable of assuming a plurality of intermediate remanent flux states between said two limiting states, first winding means inductively associated with said core for magnetizing said core to a selected one of said limiting states and for thereafter magnetizing said core in a plurality of equal and discrete steps from said selected limiting state to the other of said limiting states, second winding means inductively associated with said core and having a relatively constant value of inductance during said plurality of magnetizing steps, said value of inductance being substantially reduced when said core is magnetized to said other of said limiting states, and electrical damping means coupled to said second winding means and uniquely responsive to said reduction of inductance of said second winding means comprising a resistor and a capacitor connected in series across said second winding means and selected to provide critical damping for output voltage pulses only for said constant value of inductance of said second winding means, whereby said output voltage pulses are critically damped for each of said magentization steps and are oscillatory when said core attains said other limiting state, and means for discriminating between the critically damped and the oscillatory output voltage pulses.

References Cited in the file of this patent

FOREIGN PATENTS 890,375    Germany  ---------------  Sept. 17, 1953

OTHER REFERENCES

"A Magnetic Scaling Circuit" (Hert), Journal of Applied Physics, vol. 22, January 1951, pp. 107–108.

Multi-Stable Magnetic Memory Techniques (Goodell), Radio-Electronic Engineering, December 1951, pp. 3–4.

"Siemens Zeitschrift" (Duffing), vol. 26, April 1952, pp. 140–144.

UNITED STATES PATENT OFFICE

CERTIFICATE OF CORRECTION

Patent No. 2,898,580                                               August 4, 1959

Martin J. Kelly

It is hereby certified that error appears in the printed specification of the above numbered patent requiring correction and that the said Letters Patent should read as corrected below.

Column 5, line 39, before "plurality" insert -- said --; line 62, for "critical" read -- critically --; line 66, for "mutlistable" read -- multistable --; column 6, line 8, after "said", second occurrence, insert -- second --; column 7, line 9, for "magentization" read --magnetization--.

Signed and sealed this 23rd day of February 1960.

(SEAL)
Attest:

KARL H. AXLINE                                                   ROBERT C. WATSON

Attesting Officer                                              Commissioner of Patents